Jan. 4, 1966 H. BLADES ET AL 3,227,784
PROCESS FOR PRODUCING MOLECULARLY ORIENTED STRUCTURES BY
EXTRUSION OF A POLYMER SOLUTION
Original Filed Jan. 31, 1962 4 Sheets-Sheet 1

METHYLENE CHLORIDE – LINEAR POLYETHYLENE

INVENTORS
HERBERT BLADES
JAMES RUSHTON WHITE
BY
ATTORNEY

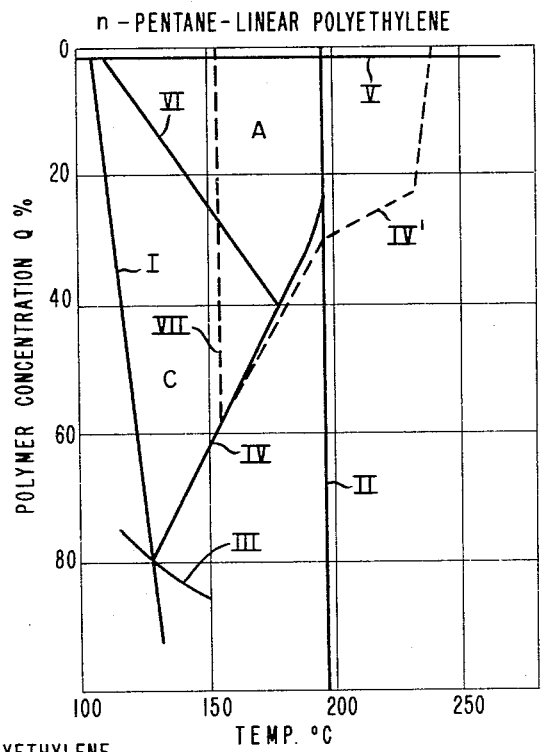
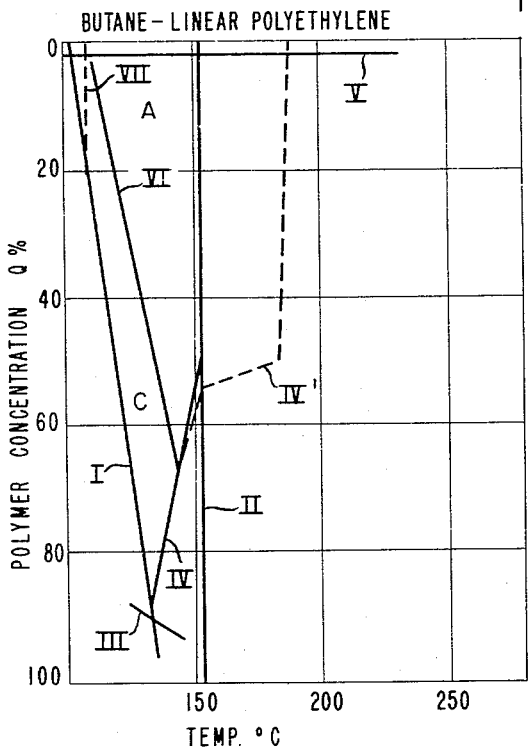

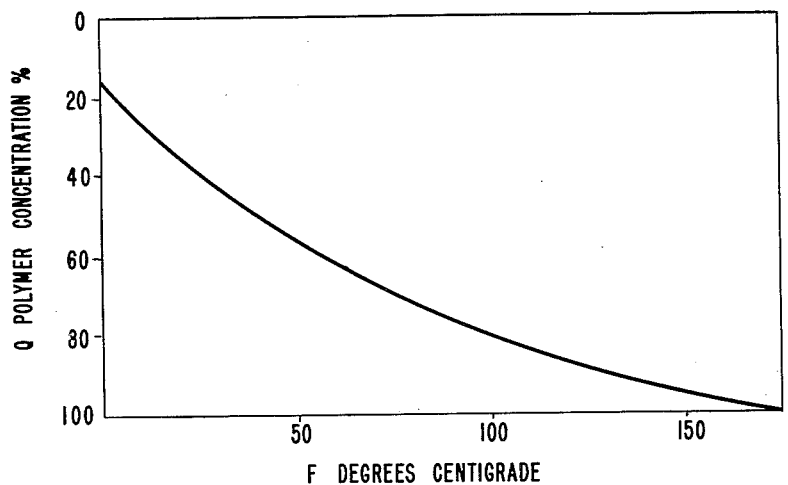
FIG. 7
FIG. 8
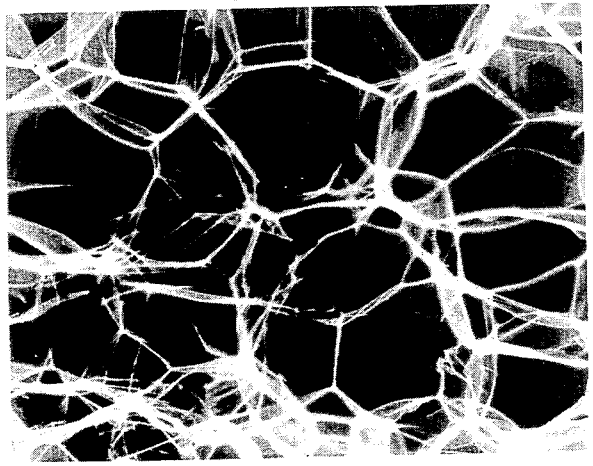
FIG. 9
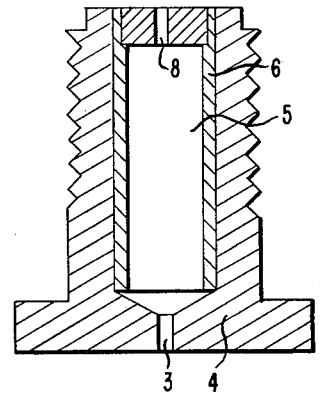
FIG. 10
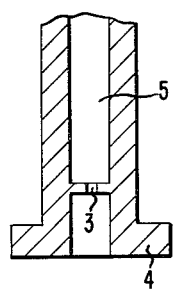
FIG. 11
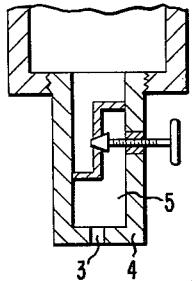
INVENTORS
HERBERT BLADES
JAMES RUSHTON WHITE

United States Patent Office 3,227,784
Patented Jan. 4, 1966

3,227,784
PROCESS FOR PRODUCING MOLECULARLY ORIENTED STRUCTURES BY EXTRUSION OF A POLYMER SOLUTION
Herbert Blades, Wilmington, and James Rushton White, Chadds Ford, Del., assignors to E. I. du Pont de Nemours and Company, Wilmington, Del., a corporation of Delaware
Original application Jan. 31, 1962, Ser. No. 170,187. Divided and this application Feb. 10, 1964, Ser. No. 354,192
20 Claims. (Cl. 264—53)

This application is a continuation-in-part of applications Serial Nos. 858,725 and 858,772, filed December 10, 1959 and Serial No. 736,337, filed May 19, 1958 which are in turn continuations-in-part of application Serial No. 665,099, filed June 11, 1957 and all now abandoned and is a divisional application of Serial No. 170,187, filed January 31, 1962.

This invention relates to a flash extrusion process for preparing microcellular and other molecularly oriented polymer structures.

The porous polymer structures which heretofore are well known in the art can generally be described as consisting of a solid polymer matrix having distributed therein voids which may be either isolated or intercommunicating. The shape of such voids varies all the way from spherical pockets to quite irregular channels depending on their method of preparation. Irregular channels normally arise, for example, when the porous article has been prepared by partial fusion of the surfaces of the particles of a granular polymer mass. Extraction of a fugitive material (e.g., salt crystals) from a solidified mixture of molten polymer containing a major proportion of said fugitive material has also yielded irregular channels.

Other prior art processes generally tend to give more nearly spherical voids. One procedure has been to distribute a solid blowing agent throughout a polymer mass and heat this mixture above the polymer softening temperature whereupon the blowing agent decomposes to gaseous products which are trapped within the polymer to produce voids. Another method has been to whip a molten polymer into a coarse froth and cool the same to solidification. The bubble size may be controlled in part by addition of surface active agents or by extrusion through bubble comminuting screens.

A critical feature in all of the above processes is stabilization of the porous product before the hot polymer collapses and destroys the structure. Various ways to improve the form stability of the hot structure include quenching in a liquid coolant or lightly cross-linking the polymer, either chemically or by irradiation.

Another problem is control of bubble size. Some control has been achieved in the prior art processes by adjusting temperature, blowing agent, or gas concentration, rate of expansion, addition of surface active agents, and extrusion through screens as mentoined above. It has also been reported that when fillers are added, smaller sized bubbles are produced, although the primary purpose of the fillers has generally been to increase opacity, furnish color, lower cost, or improve strength or stiffness.

It is an object of the present invention to provide an efficient process for the direct production of ultramicrocellular structures and/or plexifilamentary products from a polymer solution. Another object is to provide a process for producing a supple ultramicrocellular shaped structure of synthetic organic crystalline polymer having high strength and relatively low apparent density. Still another object is to provide a process for producing ultramicrocellular yarns and sheets which are uniform and opaque, even in thin sections. Other objects will appear hereinafter.

The process of this invention provides integral utramicrocellular products comprised of open and closed cells in any proportion. Open cells are usually formed from closed cells whose end walls (i.e., those generally perpendicular to the machine direction) have ruptured. These frequently occur in sequences, leading to tunnels or channels.

Substantially all of the polymer is present as filmy elements whose thickness is less than 2 microns and preferably under 0.5 microns. The thickness of a cell wall, bounded by intersections with other walls, does not vary by more than ±30%. Adjacent walls have equal thickness within a factor of 3. The polymer in the cell walls exhibits uniplanar orientation and a uniform texture. In strand form, the ultra microcellular structure has a tenacity of at least 0.1 g.p.d. The microcellular sheets have in general, a tenacity of at least 5 lbs./in./oz./yd.$^2$ in the machine direction and a TAPPI opacity of at least 70% at 1 oz./yd.$^2$ The apparent density of the products ($\rho$) is between 0.5 and 0.005 g./cc. The number of cells per cc. ($n_f$), is at least $10^5$, preferably $10^6$ or greater, as estimated from the equation $$n_f = \left(\frac{\rho}{3t\rho_0}\right)^3$$

where $t$ is the wall thickness in cm., and $\rho_0$ is the bulk polymer density.

The wall thickness and transverse cell dimensions are determined by microscopic examination of cross sections cut perpendicular to the machine direction. Thus 20–60 micron thick sections may be cut from a frozen sample with a razor blade. Large cell (>50 microns) samples are frozen directly in liquid nitrogen. Smaller celled samples are preferably "imbedded" in water containing a detergent and then frozen and sectioned. The transverse dimension of one or more cells can be readily measured by the freezing and sectioning technique mentioned above which at least partially inflates the cells. The cells will then exhibit a general polyhedral shape as illustrated in FIGURE 8, similar to the shape of the internal bubbles in a foam of soap suds. It is found that the average transverse dimension of the cells is less then 300 microns and that the transverse dimensions of a single cell in a fully inflated condition do not vary by more than a factor of three. In the preferred structures the average transverse dimension is under 100 microns. The ratio of the cell volume to the cube of the wall thickness can be calculated and exceeds about 200. For very thin walled samples (<1 micron), the wall thickness is preferably measured with an interferometer microscope. A layer of the sample is peeled off by contact with "Scotch Tape." The layer is freed from the tape by imersion in chloroform and subsequently placed on the stage of the microscope for measurement.

The process comprehends producing other novel and useful products as well, by predetermined choice of operating conditions as hereinafter described. These other products comprise fibrous strands of plexifilamentary synthetic crystallizable polymeric material. The individual fibrils of this material are comprised of thin film- or ribbon-like strips of polymer which are joined into a three-dimensional network. These film-fibrils, generally of the order of centimeters in length, often occur in a folded or crumpled configuration about their long axis, accentuating their fibrillar appearance. The fibrils are generally coaxial with the strand. Variants of this structure occur where the film-fibrils exist in relatively dense compacted layers connecting portions of the network or encasing the network in a thin tubular polymeric sheath. These plexifilamentary products have certain features in common with the microcellular products of this invention, namely, the extreme thinness of the film of the structural elements and the appreciable orientation of the polymer comprising the film.

The term "uniplanar orientation" employed in defining the products of this invention may be fully understood from the following discussion. "Axial," "planar," and "uniplanar" indicate different types of molecular orientation of high polymeric crystalline materials. "Axial orientation" refers to the perfection with which the crystalline axis parallel to the molecular chain axis in a sample is aligned with respect to a given direction, or axis, in the sample. For example, prior art materials which have been drawn in one direction only (e.g., fibers or one-way stretched films) generally exhibit an appreciable degree of axial orientation along the stretch direction. Planar orientation refers to the perfection with which the crystalline axis parallel to the molecular chain axis is oriented parallel to a surface of the sample. Conventional two-way stretched films generally exhibit a degree of planar orientation in that their molecules lie approximately parallel to the surface of the film, although the molecules may point in random directions within this plane. Uniplanar orientation is a higher type of polymer orientation in that it refers to the perfection with which some specific crystalline plane (which must include the molecular chain) in each polymer crystallite is aligned parallel to the surface of the sample. Obviously, only crystalline polymers can exhibit uniplanar orientation. There is no restriction imposed on the direction of the molecular axis within the plane of the sample. Thus, these three types of molecular orientation may occur singly or in combinations; for example, a sample might simultaneously exhibit uniplanar and axial orientation.

Electron diffraction furnishes a convenient technique for observing the presence of uniplanar orientation in the microcellular structures of this invention. A single cell wall is placed perpendicular to the electron beam. Since the Bragg angle for electron diffraction is so small, only crystalline planes essentially parallel to the beam (perpendicular to the wall surface) will exhibit diffraction. If the sample does in fact have perfect uniplanar orientation, there is some crystalline plane which occurs only parallel to the film surface and, therefore, will be unable to contribute to the diffraction pattern. Thus, the observed pattern will lack at least one of the equatorial diffractions normally observed for an axially oriented sample of the same polymer. If the degree of uniplanar orientation is somewhat less than perfect, there may be a few crystallites tilted far enough to contribute some intensity to the diffraction pattern, but at least one of the equatorial diffraction intensities will be appreciably less than normal. Thus, for the purpose of this invention, a sample is considered to have uniplanar orientation when at least one of the equatorial diffractions appears with less than one-half its normal relative intensity as determined on a randomly oriented sample of the same polymer.

One precaution must be observed in making this measurement. If the sample field examined by the electron beam is stopped down so far that it "sees" only one crystallite at a time, it will always be possible, even for a randomly oriented sample, to find some crystallite oriented parallel to the sample surface which would, of course, give a uniplanar orientation diffraction pattern. In order to insure that the uniplanar orientation pertains to the whole film element and not just to one crystallite, the measurement should be made examining a field of at least 100 square microns area, which is large enough to include the contributions from many crystallites simultaneously. Other techniques of measuring uniplanar orientation and their correlation with electron diffraction measurements are described in the J. Pol. Sci. 31, 335 (1958) in an article by R. S. Stein.

The term "uniform texture" applied to the polymer in the cell walls means that the orientation, density, and thickness of the polymer is substantially uniform over the whole area of a cell wall, examined with a resolution of approximately ½ micron. This is best determined by observing the optical birefringence in the plane of a wall of a cell removed from the sample. For microcellular samples with a net overall axial orientation, the individual cell walls will also normally exhibit an axial orientation in addition to the required uniplanar orientation. In the birefringence test, such products of the present invention will show a uniform extinction over the whole area of the cell wall. Samples with no net axial orientation must show a uniform lack of birefringence over their whole area rather than numerous small patches of orientation with each patch oriented at random with respect to the others. Lacy or cobweb-like cell walls, of course, do not have uniform birefringence over the whole area of a cell wall, and such products are readily distinguished from the uniform textured products of this invention.

In the process of this invention for producing ultramicrocellular structures and/or fibrillated (three-dimensional network of ribbon-like elements) products, a confined mixture of a polymer plus at least one activating liquid is heated to a temperature and pressure at which a homogeneous solution is formed, and which temperature is greater than the normal boiling point of the liquid. (The term boiling point or normal boiling point as used herein refers to the temperature at which a liquid boils under an external pressure of one atmosphere.) This solution, either under autogenous pressure or higher pressure as hereinafter defined, is extruded abruptly to a region of substantially lower pressure and temperature under such conditions that a very large number of bubble nuclei exist at the extrusion orifice. The initial concentration is chosen, as hereinafter described, such that vaporization of the activating liquid rapidly cools the solution to the temperature at which the polymer precipitates, and freezes in the polymer orientation produced in the rapid extrusion and expansion process. These events all occur within a small fraction of a second, i.e., $10^{-2}$ seconds or less.

The use of pressures greater than the vapor pressure of the activating liquid (the autogenous pressure) is frequently desired in the process of this invention to diminish or eliminate phase separation prior to extrusion, or to provide increased nucleation during extrusion. As the temperature of the polymer-activating liquid solution is raised to temperatures appreciably above the normal boiling point of the activating liquid, thermal expansion decreases the density of the activating liquid and makes it a poorer solvent. If the solvent power drops too far, phase separation of the solution occurs. This effect can be counteracted by applying super-autogenous pressure to the system, for example by a mechanical piston, to increase the activating liquid's solvent power by bringing its density back up.

Separation of the polymer solution into two liquid phases may or may not, be desirable. If the two phases separate readily into two liquid layers of unequal polymer concentration, extrusion will be erratic, and the technique described above may be employed to produce a single phase of uniform composition. On the other hand extrusion of a two phase system may actually be desirable, if the system may be maintained as such a fine dispersion that the dimensions of the dispersed droplets are small compared to the size of the extrusion orifice. In this case the average polymer concentration being extruded remains constant so that extrusion behavior is uniform, and the presence of the droplets will assist in achieving adequate fibrillation as described hereinafter. A preferred technique with such systems is to employ sufficient pressure in the main body of the equipment to guarantee a single phase, uniform composition, stable solution. This solution is fed through an orifice to reduce the pressure enough to form two liquid phases (with, or without, bubble nucleation as described in a subsequent section on "preflashing") just prior to delivery to the extrusion orifice. The step of extrusion as recited in the appended claims is intended to encompass passage through an orifice of solutions which may be in the form of such transitory multiphase systems immediately prior to issuance into the region where vaporization of activating liquid causes solid polymer precipitation and freezing-in of the polymer orientation.

When superautogenous pressures on the spinning solution prior to extrusion are required to achieve adequate nucleation, these are obtained by dissolving a lower boiling additive in the solution. These will assist nucleation by increasing the "internal pressure" and lowering the surface tension of the solution. Although any soluble low boiling material is suitable, the preferred materials are those which are super-critical at temperatures above the polymer melting point. Useful additives include $N_2$, $CO_2$, He, $H_2$ methane, ethane, propane, ethylene, propylene, certain fluorinated and/or chlorinated methanes and ethanes, and equivalents.

Suitable activating liquids for use in this process should preferably have the following characteristics:

(a) The liquid should have a boiling point at least 25° C. and preferably at least 60° C. below the melting point of the polymer used;
(b) The liquid should be substantially unreactive with the polymer during mixing and extrusion;
(c) The liquid should be a solvent for the polymer under the conditions of temperature, concentration and pressure suitable in this invention as set forth below;
(d) The liquid should dissolve less than 1% of high polymeric material at or below its boiling point:
(e) The liquid should form a solution which will undergo rapid vaporization upon extrusion, forming a non-gel polymer phase (i.e., a polymer phase containing insufficient residual liquid to plasticize the structure).

In these requirements, the process of the present invention differs radically from conventional foam producing or fiber producing techniques. Choice of a suitable activating liquid is, of course, dependent on the particular polymer in question. Among those found useful are methylene chloride, ethyl chloride, fluorotrichloromethane, pentane, butane, and ethanol.

The polymers suitable for use in this invention are members of the class of synthetic crystallizable, organic polymers which includes polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and eqiuvalents. The polymers should be of at least film forming molecular weight.

One of the features of this invention is the high degree of orientation of the polymer in the cell walls, which contributes to the unique strength of these structures. Therefore, a preferred class of polymers from which to make these objects is that class of polymers which responds to an orienting operation (e.g., drawing of fiber or films) by becoming substantially tougher and stronger. This class of polymers is well known to one skilled in the art and includes, for example, linear polyethylene, polypropylene, 66 nylon, and polyethylene terephthalate. Another feature of the predominantly closed cell microcellular articles of this invention is their very high degree of pneumaticity resulting directly from their unique structure, which may be looked upon as numerous tiny bubbles of gas enclosed in thin polymer skins. Retention of this gas, and hence of the structure's pneumaticity depends on a low rate of gas diffusion through the polymer walls. Therefore, another preferred class of polymers particularly for preparing microcellular structures where pneumaticity is important, is that class of polymers with low permeability coefficients for gases, such as polyethylene terephthalate. Polymer properties such as solubility, melting point, etc. are usually reflected in the properties of the ultramicrocellular product. Common polymer additives such as dyes, pigments, antioxidants, delusterants, antistatic agents, reinforcing particles, adhesion promoters, removable particles, ion exchange materials, U.V. stabilizers and the like may be mixed with the polymer solution prior to extrusion.

Only certain special combinations of concentration and temperature for the activating liquid-polymer system will produce the microcellular products of this invention and the plexifilamentary materials described earlier. Thus, for a given concentration, only a limited temperature range is suitable; the minimum temperature corresponds to the freezing point of the solution, and the maximum temperature is limited by the amount of adiabatic cooling generated during the expansion process. Similarly, for a given temperature, only a limited range of concentrations is suitable, a certain minimum quantity of activating liquid being required to produce sufficient cooling for polymer precipitation on adiabatic evaporation. To prepare the microcellular products of this invention, the maximum quantity of activating liquid is determined by the point beyond which so much liquid is evaporated in cooling the solution to the precipitation temperature that the resulting cell walls are too thin to withstand the residual internal gas pressure whereupon catastrophic rupture produces the fibrillated plexifilament product. This product in turn cannot be prepared from indefinitely dilute polymer solutions, since eventually a point is reached where so much gas volume is generated per gram of polymer that the structure is no longer coherent, i.e., is not a continuous three-dimensional plexifilamentary structure.

The permissible combinations of temperature and concentration required in the practice of the process of this invention as described above are illustrated in the attached figures, where FIGURE 1 represents a generalized graphical definition of suitable conditions of temperature and concentration applicable to any polymer-activating liquid combination. The detailed shapes of the curves, as well as the specific values of the ordinate and abscissa will, of course, depend on the particular system chosen, and may be ascertained for any given system as hereinafter described.

FIGURE 3 represents a graphical definition of suitable conditions of temperature and concentration for the specific combination of linear polyethylene and pentane.

FIGURE 4 represents a graphical definition of suitable conditions of temperature and concentration for the specific combination linear polyethylene and butane.

Figure 6:
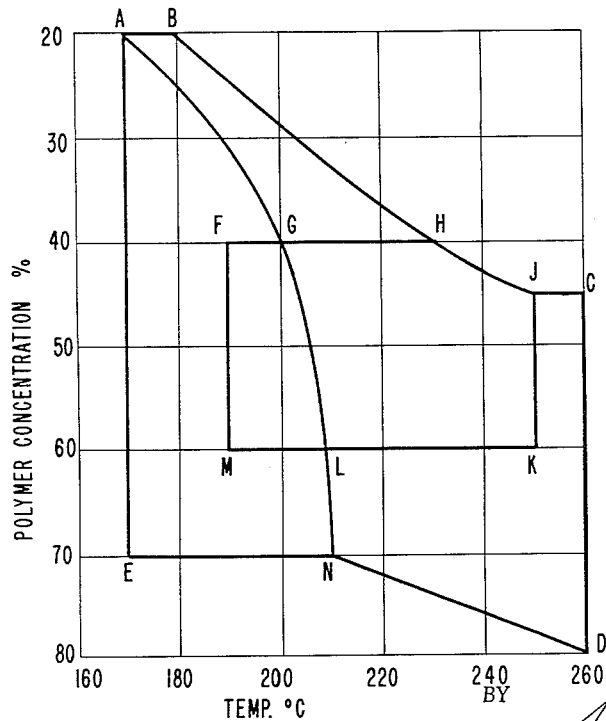

FIGURE 6 represents an empirical graphical definition of suitable conditions of initial temperature and concentration for the specific combination of polyethylene terephthalate and methylene chloride. The area ABCDE corresponds to area C for this system, which will lead to microcellular products, as contrasted with fibrillated products. The boundary line ABC is set by solubility limitations. The line AGLN is the melting curve, and the extension of area C to temperatures below this curve illustrates the supercooling phenomenon hereinafter described. Area FHJKM is the preferred operating area.

FIGURE 7 represents a graphical definition of the empirical function $F=f(Q)$ required in determining curve III as hereinafter described.

FIGURE 8 is a photomicrograph of an ultramicrocellular structure showing the polyhedral character of the cells.

FIGURES 9, 10 and 11 are drawings showing cross-sectional views of spinnerets suitable for use in the practice of this invention.

Area C bounded by curves I, V, VI, and IV', of each figure defines operable conditions for practicing the process of this invention to prepare the microcellular products of this invention. Area A, bounded by curves V, VI, and IV', defines the conditions for preparing the plexifilamentary products. The solution temperature is represented in degrees centigrade and the polymer concentration is expressed in weight percents. The individual curves are plotted from the following considerations:

Curve I represents the freezing point of homogeneous mixtures of polymer and activating liquid at various ratios of components. This information is easily ascertained by independent determinations on any polymer-activating liquid system of interest. Curve I may often be approximated satisfactorily by a straight line:

$$Q_{fp}=gT_{fp}+W \qquad (1)$$

which passes through the two points representing the freezing points ($T_{fp}$) for 10% and 70% mixtures. As is well understood to those skilled in the art, a higher order polynominal, is generally more representative of a freezing curve:

$$Q_{fp}=g_1(T_{fp})^2+g_2(T_{fp})+W \qquad (1a)$$

$Q_{fp}$ is the polymer concentration at the freezing point in weight percent, and g and W are constants. All temperatures are in degrees centigrade.

Frequently, the freezing and melting point curves are identical, but for some systems, such as polyethylene terephthalate-methylene chloride, substantial degrees of undercooling of the solutions are possible so that the freezing curve (as observed within a reasonable time scale) comes at considerably lower temperatures than the melting curve. Such supercooled solutions—even though metastable—perform satisfactorily, and the freezing point curve is thus the proper low temperature boundary for area C.

Curve II is expressed by the equation $$T=T_c \qquad (2)$$

where $T_c$ is the critical temperature of the activating liquid. It is possible to operate at temperatures somewhat above $T_c$ for those systems having enough interaction energy between polymer and activating liquid so that a solution can be prepared even above $T_c$ by application of suitable pressure.

Curve III may be represented by the equation $$T=F+T_{BP}=f(Q)+T_{BP} \qquad (3)$$

where $T_{BP}$ is the boiling point of the pure activating liquid at atmospheric pressure, and $F=f(Q)$ as given graphically in FIGURE 7. The function of curve III is to define the point (Q', T') given by the intersection of curve III with curve I. (The point Q', T' will be employed to locate curve IV, the sintering curve, as defined below.) Curve III is obviously simply the curve of FIGURE 7 shifted by a number of degrees equal to the boiling point of the chosen activating liquid. The curve of FIGURE 7, in turn, is simply an empirical curve based on the experimentally determined points Q', T' for a number of different polymer-activating liquid systems. It is of value in predicting the approximate location of the point Q', T' for any system.

Curve IV is defined as the sintering curve. It is that special one of the infinite number of cooling curves represented by equation 4 which passes through the point Q', T' located by the intersection of curves I and III.

$$\frac{dY}{dT}=Y\frac{C_s}{H}+\frac{C_p}{H} \qquad (4)$$

where, $Y=100-Q/Q$
$C_s$=heat capacity of activating liquid, calories/gm./°C.
$C_p$=heat capacity of polymer, calories/gm./°C.
$H$=the heat absorbed in calories when one gram of the activating liquid evaporates from the solution. It is equal to $H_v+H_i$ where $H_v$ is the heat of vaporization of the activating liquid in calories per gram and $H_i$ is the heat of interaction involved in transferring one gram of activating liquid from the polymer solution into a quantity of pure activating liquid at the same temperature. $H_i$ is ordinarily so small compared to $H_v$ that it may be neglected without causing serious error in determining curve IV. The major effect on curve IV of including $H_i$ is to extend the curve somewhat above the critical temperature, curve II, since $H_v$ becomes 0 at the critical temperature.

$C_p$, $C_s$ and H are functions of temperature and may be represented in the customary fashion by the following expressions:

$$C_p=a+bT \qquad (4a)$$
$$C_s=a'+b'T \qquad (4b)$$

$$H \cong H_v = H_1\left(\frac{1-\left[\frac{T+273}{T_c+273}\right]^{0.38}}{1-\left[\frac{T_1+273}{T_c+273}\right]}\right) \qquad (4c)$$

a, b, a', and b' are empirical constants which may be obtained directly from published tables of heat capacities or may be individually determined by known methods. $H_1$ is the heat of vaporization of the activating liquid at a given temperature, $T_1$.

Figure 1:
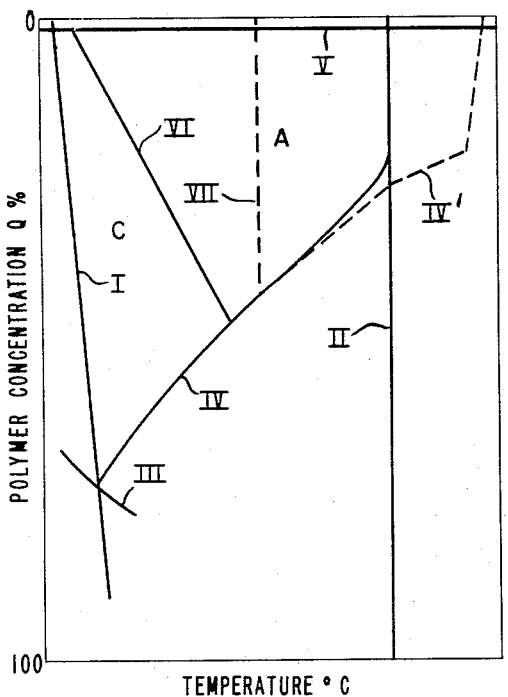

Inspection of Equation 4 reveals that it is based on equating the heat absorbed by evaporation of incremental quantities of activating liquid to the heat released in cooling the remaining solution of activating liquid plus polymer. This assumption of an adiabatic process is justified by the extremely short period of time over which the process occurs (less than $10^{-2}$ seconds). One such cooling curve can be constructed starting from any composition and temperature corresponding to a point to the right of curve I of FIGURE 1. The existence of an unique such curve, curve IV, called the sintering curve, can be justified on the basis of the following considerations. If a given composition is heated to higher and higher temperatures, eventually a point will be reached where even evaporation of all the activating liquid present will absorb insufficient heat to cool the residual polymer below its melting point. The cellular product thus produced would have low form stability, and subsequently would appear to be sintered. Thus, in the absence of other complications, the sintering curve would be that cooling curve passing through the terminal point $Q=100$, $T$=polymer melting point. However, in order to freeze in the polymer orientation generated in the rapid extrusion and expansion process, enough activating liquid must remain at the instant the solution reaches the freezing curve so that its vaporization will absorb the heat of fusion of the polymer and "set" the structure in solid form. The lower boiling activating liquids, i.e., those which boil at least 60° C. below the polymer melting point, will in general evaporate fastest and thus prevent the relaxation of this orientation most efficiently, and it is for this reason they are preferred. Furthermore, due to the extreme rapidity of the expansion process, there is insufficient time for all the activating liquid present to diffuse to the bubble surface and evaporate (it is well known that diffusion rates become much smaller at lower solvent concentrations), so that in practical cases only part of the activating liquid can contribute to the initial adiabatic cooling process. Therefore, the practical sintering curve passes not through the polymer melting point, but through some point $Q'$, $T'$ on the freezing curve where $Q'$ is less than 100%. For a new polymer-activating liquid system the point $Q'$, $T'$ is readily determined by observing which conditions produce sintered products or by the intersection of curves I and III as described above.

An extra benefit realized from super autogenous pressure spinning, is the provision of an additional cooling mechanism due to expansion of the liquid solution on extrusion into the lower pressure region. Obviously, no activating liquid will evaporate until the pressure on the solution has fallen at least to the autogenous pressure, and during this period the liquid solution will expand. Depending on the initial conditions, this liquid expansion may produce a self-cooling (without any change in concentration) prior to adiabatic cooling through activating liquid vaporization. This liquid expansion cooling mechanism has the effect of permitting solutions at somewhat higher temperatures than indicated by curve IV to be successfully spun if suitable super autogenous pressures are employed. The requirement is that adiabatic liquid expansion cooling be sufficient to bring the temperature of the solution below curve IV as calculated for autogenous pressures. Curve IV' indicates the boundary for areas A and C where superautogenous pressures are employed. This curve is computed with the aid of the equation of state given by Hirchfelder et al., Ind. & Eng. Chem. 50, 375–385 (1948).

Curve V is represented by the equation $$Q = 2\% \qquad (5)$$

This line represents the upper boundary of the operable spinning area. It has been discovered that solutions with less than 2% polymer concentration ordinarily do not yield coherent products in the process of this invention. Presumably, the very large volume of solvent vapor generated per unit of polymer, plus the tendency toward substantial degrees of supercooling for very dilute polymer solutions, accounts for this effect.

Curve VI divides the operable process area bounded by curves I, IV' and V into two areas A and C. Curve VI may be represented by an empirical equation.

$$T = A + BQ \qquad (6)$$

For linear polyethylene systems, A may be set at 110° C., and B depends on the particular activating liquid. Representative values of B are: cyclohexane, 12; methylene chloride, 4,6; fluorotrichloromethane, 2.5; pentane, 1.7; and butane, 0.5. The values of B show a rough correlation with the boiling point of the activating liquids. The value is also dependent on apparatus geometry, the pressure of the region into which the solution is extruded, whether superautogenous pressures are employed, and whether additives are present in the solution. Low boiling additives or surface tension reducing agents tend to decrease B. For example, B for cyclohexane is only 1.7 when the system is pressurized with 850 p.s.i.g. of carbon dioxide.

In general area A represents solutions at lower polymer concentrations and higher initial temperatures compared to area C. This corresponds to lower solution viscosities, higher activating liquid diffusion coefficients, and higher autogenous pressures which leads to more violent extrusion and activating liquid evaporation. Thus, it is not surprising that products prepared from initial conditions in area A are the fibrillated products described earlier, while those prepared from conditions in area C are the substantially monolithic microcellular products.

It is possible to vary the fractions of open and closed cells in these microcellular products by choosing the operating conditions close to, or far removed from, the conditions which produce a fibrillated material, as defined by curve VI. It is even possible to operate satisfactorily somewhat beyond the bounds of curve VI, if suitable compensation is made to control the course of the initial expansion, as by the use of a cone-shaped shroud immediately following the extrusion orifice. It is likewise possible to increase the violence of the expansion, for example by going to very high superautogeneous pressures within the pressure vessel, and thus produce fibrillated products on the area C side of curve VI.

Figure 5:
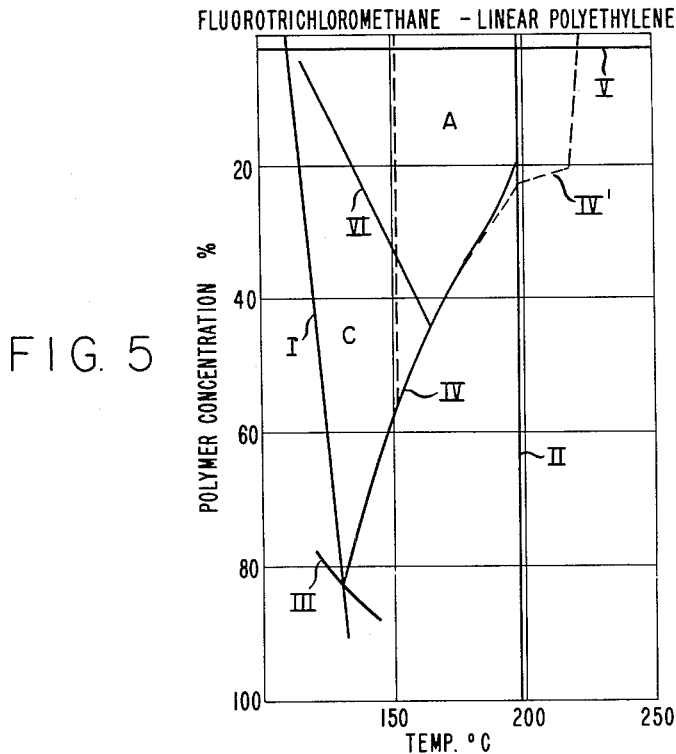
FIGURE 5 represents a graphical definition of suitable conditions of temperature and concentration for the specific combination linear polyethylene and fluorotrichloromethane.

Certain parts of area A are preferred for making plexifilamentary products. Thus in FIG. 2, the preferred area is that above 180° C.; in FIG. 3 it is above 140° C. and at polymer concentrations below 35%; in FIG. 4 it is the area above 130° C. and at polymer concentrations less than 32%; and in FIG. 5 it is that portion indicating temperatures above 145° C. and polymer concentrations below 25%.

Area C, bounded by curves I, IV', V and VI, defines the initial conditions of solution temperature and concentration which, in conjunction with other requisite process factors herein described, will produce the ultra-microcellular structures of the present invention. All temperatures within area C are higher than the normal boiling point of the activating liquid. It is obvious that some degree of control of the apparent density of the product can be achieved by choice of operating conditions within area C, lower densities being favored by high activating liquid concentrations and choice of conditions furthest removed from curve I.

Conditions of initial solution temperature and concentration which fall to the right of curve VI produce a predominantly fibrillated structure. Products obtained from conditions below curve IV' and to the right of curve I are "sintered," and do not have the orientation of the products of this process. Initial conditions above curve V do not produce continuous solid products, and conditions to the left of curve I represent solid/liquid phase systems which cannot be satisfactorily extruded.

An economically attractive process comprises polymerizing the polymer directly in the activating liquid, adjusting the temperature and concentration to the desired values, and extruding the solution directly. It is possible, for example with the system polyethylene-pentane, to polymerize directly to the desired concentration, and to employ the heat of reaction to raise the temperature to the desired final pre-extrusion value, and extrude this solution.

Figure 2:
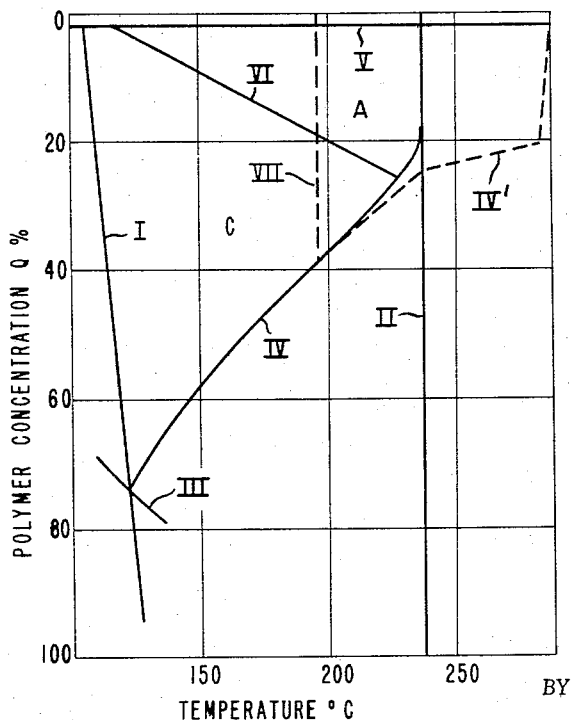
FIGURE 2 represents a graphical definition of suitable conditions of temperature and concentration for the specific combination of linear polyethylene and methylene chloride.

FIGURE 2 is the graphical plot of concentration and temperature conditions for the specific combination linear polyethylene/methylene chloride. FIGURE 3 is a similar plot for the combination linear polyethylene/pentane. The curves for these diagrams were calculated for the case of no dissolved gas, using the following basic data and the Runge-Kutta method with a $\Delta T$ of 10° for solving Equation 4:

| Polymer—Activation liquid | Linear Polyethylene—$CH_2Cl_2$ | Linear Polyethylene—Pentane |
|---|---|---|
| $T_{fp}$ at 10% | 107 | 109° C. |
| $T_{fp}$ at 70% | 121 | 126° C. |
| $T_c$ | 238 | 197.2° C. |
| $T_{BP}$ | 39.95 | 36.2° C. |
| $C_a$ | 0.275 at 0° C | 0.526 at 0° C. |
| $C_a$ | 0.280 at 100° C | 0.651 at 100° C. |
| $C_p$ | 0.550 at 10° C | 0.550 at 10° C. |
| $C_p$ | 0.598 at 100° C | 0.598 at 100° C. |
| $H_1$ | 78.6 at 39.95° C | 71 at 100° C. |

Since the process of this invention employs relatively low concentrations, the solution viscosities are lower than those generally encountered. This feature, together with the high pressures employed, results in characteristically high extrusion velocities, ordinarily from several hundred y.p.m. to several thousand y.p.m., for the process of this invention.

In order to obtain either the very thin films of the plexifilamentary product or a microcellular product having $10^5$ or more cells/cc. and avoid producing large non-uniform cells, a very large number of bubble nuclei must be available in the solution at the instant the solution is extruded or spun from the high pressure region, with concentration and temperature corresponding to a point in area A or C, into a region of lower pressure. The vapor generated by rapid evaporation of the activating liquid at this instant causes the resultant vapor bubbles to grow and generate the thin films or the required cell dimensions in the final product.

One method of guaranteeing the presence of a sufficiently large number of bubble nuclei is to provide for a sufficiently large pressure drop at the instant the solution passes through the orifice from one region to the other. Since the final pressure P° is governed by the conditions existing in the low pressure region (ordinarily one atmosphere), the requisite pressure drop can be obtained only by exceeding some minimum equilibrium pressure in the high pressure region. Frequently, the autogenous pressure of the solution is not sufficiently high, so a partially soluble inert gas is added to bring the total internal pressure up to the desired value prior to extrusion. Simply increasing the mechanical pressure on the solution, as for example with a high pressure pump or piston will not provide any additional internal driving force which might be required for nucleation and bubble growth upon extrusion of the solution into the low pressure region.

The minimum pre-extrusion equilibrium pressure to be employed for the present process in spinning a composition at a temperature represented by a point within area A or C is estimated from the following equation (based on equations taken from L. Bernath, Ind. Eng. Chem., 44, 1310 (1952)):

$$\Delta P = P + P' - P_o = \sqrt{\frac{5.3 \times 10^4 \gamma_3}{[T+273]\left[25.6 - 5.2 \times 10^{-9}\frac{HM}{(T+273)} + \log \frac{D_L}{M} + \frac{1}{2}\log \frac{\gamma}{M}\right]}} \qquad (7)$$

where P is the vapor pressure in atmospheres of the activating liquid at the selected solution temperature P' is the equilibrium pressure in atmospheres of the dissolved gas P° is the prevailing pressure in the atmosphere into which the solution is extruded M is the molecular weight of the activating liquid $D_L$ and $\gamma$ are the density and surface tension of the polymer-activating liquid solution, including the contribution of any dissolved gas.

It has been found that substitution of the density and surface tension of the pure activating liquid for $D_L$ and $\gamma$ in Equation 7 results in $\Delta P$ values which are suitable for actual practice. The values for the activating liquids can be found in "Pressure-Volume-Temperature Relationships of Organic Compounds," R. R. Dreisbach (1952) Handbook Pub. Inc. and in Landolt-Börnstein Zahlenwerte und Functionen aus Physik, Chemie, Astronomie, Geophysik und Technik, 6th ed., Zweiter Band Dritter Teil, pg. 404 et seq.

Minimum extrusion pressures selected in accordance with Equation 7 produce a rate of bubble nucleation exceeding $10^{10}$ nuclei/cc./second. Thus the pressure drop ($\Delta P$) across the extrusion orifice should be greater than that given in Equation 7 above. The temperature at which the activating liquid alone produces sufficient pressure drop to satisfy Equation 7 is known as the self-nucleation temperature ($T_n$). It is indicated on the figures by curve VII. No nucleation assistants are required at temperatures above $T_n$. The axial length of the extrusion orifice should be kept minimal in the order of 0.1 inch or less, to obtain the greatest benefit of the nucleating agent. Likewise, any limiting apertures or lengthy tubing which might cause appreciable pressure drop between the main solution reservoir and the extrusion orifice should be avoided.

Two exceptions to this last mentioned condition are (1) when a deliberate pressure drop is required to generate a two phase system as described earlier, and (2) in certain cases of operation in area A. Thus, when it is desirable to accentuate the length of the film fibrils of the plexefilamentary products, it is expedient to employ a technique called "preflashing." In this technique, an appreciable pressure drop is arranged across a suitable orifice located between the main solution source and the final extrusion orifice. This pressure drop serves to nucleate bubbles, and enough liquid is allowed to vaporize along the path between this orifice and the final orifice to grow bubbles of limited size, but not enough to quench the solution temperature to the polymer precipitation point. When these bubbles pass through the final extrusion orifice at high velocity, the high shear transforms them into greatly elongated voids which rupture as they exit from the orifice. At the same time the vaporizing solvent cools and quenches the polymer in the form of elongated film-fibrils.

An alternate method of providing a large number of bubble nuclei at the instant of extrusion is to incorporate a particulate solid nucleating agent in the polymer solution. It is in fact possible in many cases to add enough solid nucleating agent so that the autogenous pressure of the solution itself is satisfactory, even at temperatures below $T_n$. A sufficient number of bubble nuclei to produce the products of this invention is estimated to be at least $10^6$ per cc., preferably $10^8$ or greater. The minimum diameter ($d$) which is a bubble must have to grow is $$d = \frac{4\tau}{\Delta P} \qquad (8)$$

Thus, the number of grams of any given solid nucleating agent which must be present in each cc. of solution in order to produce at least $10^6$ nuclei may be computed directly from a knowledge of how many pores per gram are present of size $d$ or larger. Naturally, these pores lose their nucleation effect if their gas content (normally air) is displaced prematurely by intrusion of the solution, caused for example by high wetting action, possibly coupled with presence of detergents or high applied pressures.

The degree of nucleation actually achieved can be estimated at least within an order of magnitude from the following equation, based on geometrical considerations for microcellular products:

$$n = \frac{\rho^2}{27 t^3 \rho_0^3} \qquad (9)$$

where:

$n$ = number of nucei/cc. of solution
$\rho$ = apparent density of microcellular product in g./cc.
$t$ = cell wall thickness in cm.
$\rho_0$ = bulk polymer density in g./cc.

$n$ should be at least $10^6$, preferably $10^8$ or greater.

The very large number of bubble nuclei guarantees that the cells in the final product will be both very small and uniform and that the film fibrils will be very thin. In order to produce microcellular sheets or fibers whose smallest dimension can frequently be less than 1 mm., it is essential that the dimensions of the cells themselves be very much smaller, in order to avoid gross non-uniformities in the products. Another advantage to be gained from the microsized cells is their light scattering ability, so that even thin sections of microcellular structures have high opacities. The unique and valuable suppleness of the products of this invention is likewise enhanced by the small dimensions of the very thin walled cells.

There is of course some minimum dimension below which microcellular and plexifilamentary structures cannot be prepared, since all the activating liquid will evaporate from the surface, and thus produce no internal bubbles. Under conditions of very high bubble nucleation, this minimum dimension can be made very small, and microcellular fibers have been prepared by the process of this invention with deniers at least as low as 10, corresponding to a diameter of approximately 0.3 mm.

The invention is further illustrated by the following examples.

Example I

The following ingredients were added to an 1800 cc. autoclave:

100 gms. linear polyethylene of Melt Index 8.6
200 gms. methylene chloride
$CO_2$ saturated at 515 p.s.i., 27° C.

This mixture was thoroughly mixed by rotation of the autoclave in an oven to raise the temperature to 149° C. with a total pressure of 1260 p.s.i. indicated on a Bourdon gauge. After making allowance for the methylene chloride contained in the free space, the calculated polymer content was 38.3 weight percent. The solution was extruded through an orifice of 0.040 inch diameter, and 0.025 inch length, having a flat face on the downstream side, and a conical entrance to the orifice on the upstream side. A continuous yarn was thereby obtained at a velocity of 5,500 yards per minute. The yarn was extremely bulky, supple and opaque. Microscopic examination showed the yarn to have a polyhedral-type closed cell structure with an average cell diameter of 20 microns and an average optical wall thickness of 0.3 micron.

Using the process of Example I but with a polymer concentration of 30.0% and a solution temperature of 137° C., a similar ultramicroporous strand was obtained. The cell diameter averaged 20 microns with minor amounts of open cells present.

Example II

A mixture of 1,000 grams of linear polyethylene (melt index equal 0.5), 750 cc. methylene chloride activating liquid, 135 grams chlorodifluoromethane, and 5 grams "Santocel" (Monsanto trademark for silica aerogel) nucleating agent was charged into a 3 l. stainless steel pressure vessel. The contents were heated and mixed 6 hours at 150° C. to form a homogeneous solution. Prior to extrusion, the pressure vessel was connected to a source of nitrogen gas at a pressure of 450 p.s.i. Extrusion occurred through a 10 mil annular orifice 3 inches in diameter with a 0.0625" long parallel and at a velocity of approximately 500 y.p.m. The microcellular sheet product thus produced is in tubular form, approximately 10 inches in diameter. There are about $10^6$ cells/cc. and the optical thickness of the cell walls varies from 0.3 to 0.6 microns from the interior to the surface of the sheet. The thickness of polymer at intersections of cell walls is less than 1 micron, characteristic of a polyhedral walled multicellular structure. The cell size ranges from 100 to 200 microns. The polymer molecules in the cell walls are oriented parallel to the plane of the wall to within 10 degrees, indicating a high degree of planar orientation. Electron diffraction indicates the (200) reflection is completely absent in the cell walls studied, indicating a high degree of uniplanar orientation. The polymer in the line of intersection of bubble walls shows a high degree of axial orientation along the direction of the intersection. The tubular product, slit longitudinally and opened to a sheet with basis weight of about 0.4 oz./yd.$^2$, has a TAPPI opacity of 86% and a tensile of 17 lb./in./oz./yd.$^2$ in the machine direction.

These microcellular sheets have a bulk density of 0.02 grams/cc. as extruded. By applying pressure up to 500 p.s.i. to the face of these sheets for 1½ minutes at a temperature of 50° C. a range of sheet products of remarkably high strength in the machine direction are obtained arising from the highly oriented polymer in the cell walls. When cut into strips they may be used as backing material for pressure sensitive bandages. When two such sheets are cross lapped and bonded with adhesive (or self-bonded by pressing at temperatures near the polymer melting point), they form a composite with exceedingly high tear strength.

The lightly pressed cross lapped sheet structures are leather-like in their suppleness, hand, and bending characteristics. They have been made into objects such as gloves, carrying cases, insulating bags, slippers and the like. It is possible to prepare such products exhibiting a range of water vapor transmission as desired in the range from about 1 to 60 grams/meter$^2$/24 hours by varying the proportion of open and closed cells by extruding closer to, or farther from the fibrillation line as shown in FIGURE 2, curve VI.

The cross lapped sheet products pressed at the higher pressures are paper-like, being light-weight, thin, flexible, and opaque. These properties plus their excellent tensile strength, tear resistance, and water insensitivity suit these sheets for use as a premium bagging material. Another very interesting product useful as a carbonless copy paper or thermographic copy paper is produced when a colored adhesive is employed in the laminating step, or when a pressed microcellular sheet is laminated to one or both sides of a colored sheet.

The paper-like pressed sheets have an ink receptive, directly printable surface. These pressed paper-like sheets are also ideally suited for use in electrostatic printing applications.

Incorporation of acicular particles such as potassium titanate will increase both bending stiffness and opacity of the microcellular products of this invention.

High strength light-weight ribbons or tapes may be prepared from pressed microcellular sheets by laminating strips to a parallel array of reinforcing cords.

A microcellular sheet was prepared according to the recipe of Example II, except that the quantities of chlorodifluoromethane and Santocel were 200 grams and 10 grams respectively. Nylon yarn was glued to the surface of this sheet in a parallel array and the composite sheets were cross lapped with their yarn surfaces in contact using an additional quantity of adhesive. The cross lapped structure was pressed. The microcellular sheet in this case serves as a convenient and inexpensive carrier for the non-woven grid of nylon yarns which give superior strength, dimensional stability, covering power and tuft holding capacity to the structure as a carpet backing material.

A bagging material may be prepared in similar manner as above. Pressed microcellular sheets are also useful as a surfacing material. They may be laminated to almost any substrate including metal, wood, cardboard, and impregnated non-woven fabrics as well as other types of fabrics such as knits, felts, wovens and non-wovens. A particularly interesting example is prepared by laminating four layers of microcellular sheets to one surface of a 16 mil vinyl film substrate. Two of the four layers were made from an annular die with a 10 mil gap, and the outer two layers were made using a 5 mil gap die. The total basis weight of the four plies was 2 oz./yd.$^2$. They were laminated to the vinyl film using Rhoplex AC 33 adhesive to produce a smooth surfaced structure 40 mils thick. This structure bears a remarkable resemblance to leather in many respects and may readily be embossed with sharp clear images.

Example III

The equipment of Example II was used and 1,000 grams of a copolymer of ethylene and 1-octene of density 0.937 (corresponding approximately to a 96/4 copolymer) and melt index of 0.54, 750 ml. of methylene chloride, 130 grams chlorodifluoromethane, and 5 grams Santocel were charged into the 3 liter pressure vessel. A solution of the copolymer was formed by heating the mixture to 150° C. for 7 hours. The autogenous pressure of 385 p.s.i.g. was increased to 405 p.s.i.g. just prior to extrusion by connecting the pressure vessel to a source of nitrogen. The microcellular copolymer sheet produced was cross lapped using an adhesive (a commercial mixture of a wax plus a vinyl acetate/ethylene copolymer, "Elvax 250"), and pressed two minutes at 70° C. and 500 p.s.i. The resulting sheet of basis weight=1.3 oz./yd.$^2$,
had tenacity=9.8 lbs./in./oz./yd.$^2$,
elongation=145%,
modulus=42 lbs./in./oz./yd.$^2$, and
work-to-break=9.1 inch lbs./in.$^2$/oz./yd.$^2$.

Tactic copolymers of ethylene with a minor amount of an $\alpha$=olefin of from 3–10 carbon atoms as above are particularly useful for preparing the products of the invention.

*Example IV*

The mixture of Example II is modified by adding 61 grams more chlorodifluoromethane and 5 grams more Santocel. This increases the autogenous pressure of the spinning solution at 150° C. to 495 p.s.i.g. The 3 inch annular orifice is changed from a 10 mil gap to a 5 mil gap, and the solution is pressurized with nitrogen to a total of 720 p.s.i.g. just prior to extrusion, which occurs at 160 y.p.m. The microcellular sheet thus produced has a TAPPI opacity of 65% and a tensile strength of 30 lbs./in.//oz./yd.$^2$. This is surprisingly high for a sheet whose basis weight is only 0.16±0.01 oz./yd.$^2$, since the normalized properties for sheet products generally fall off rapidly as the basis weight drops below 1 oz./yd.$^2$.

This sheet is cross lapped and laminated using "Scotch Tape" glue, and pressed at 50° C. and 500 p.s.i. to form a composite sheet whose total basis weight equals 0.40 oz./yd.$^2$, tenacity=16.4 lbs./in.//oz./yd.$^2$,
elongation=129%,
modulus=30 lbs./in.//oz./yd.$^2$
work-to-break=13 inch lbs./in.$^2$//oz./yd.$^2$ and
Elmendorf tear=17.7 g.//g./m.$^2$ (TAPPI standard specimen size).

These sheets are further remarkable in that the normalized water vapor transmission is not only the same for the single and cross lapped sheets, but also equivalent to that for polyethylene film. This indicates that even at this very low basis weight, these pressed microcellular sheets do not have pin holes or gross defects. This excellent uniformity at such low basis weight could only be attained by the microcellular products of the present invention.

*Example V*

To a mixture of 50% linear polyethylene of melt index 0.9 and 50% pentane (Phillips "Pure Grade") was added 1.5 Santocel (based on polymer weight). This mixture was confined in a pressure vessel beneath a "floating" piston above which 900 p.s.i. of nitrogen pressure was applied, heated to 155° C., and extruded through a ¾" by 0.010" slot having an axial length of 0.015 inch. The product was a tape about four inches wide having a basis weight of 0.93 oz./yd.$^2$, a tensile strength of 23.5 lbs./in.//oz./yd.$^2$, elongation of 110%, modulus of 226 lbs./in.//oz./yd.$^2$, and a work-to-break of 16.5 inch lbs./in.$^2$//oz./yd.$^2$. Although this product is substantially monolithic (i.e. not fibrillated or fractured into gross pieces), the conditions under which it was prepared are such as to cause rupture of substantial numbers of its microcells in such a way as to form interconnecting tunnels or channels of intercommunicating cells. This feature leads to a substantially nonpneumataic product while still retaining the excellent tensile properties reported above. The product exhibits a substantial degree of uniplanar orientation as indicated by less than half the normal electron diffraction intensity shown by certain reflections.

It is to be noted that no soluble nucleation-assisting gas was employed in this example, the nitrogen pressurizing gas being separated from the solution by the free piston. Adequate numbers of bubble nuclei to produce the microcellular products of this invention are provided in this example primarily by the fact that the spinning temperature was chosen close to the self-nucleation temperature of the pentane solvent, i.e. the temperature at which P' in Equation 7 becomes zero. The small quantity of Santocel added further guarantees adequate nucleation.

*Example VI*

A 30 gm. charge of 2 g.-T/10 (0.55/0.45) (a random copolyester containing 55 mol-percent ethylene terephthalate and 45 mol percent ethylene sebacate) was sealed in a 250 ml. stainless steel pressure vessel fitted with a spinneret having a hole 20 mils in diameter and 10 mils long. The vessel and spinneret opening were closed and the air was pumped out. A mixture of 30 gm. of ethyl chloride and 20 gm. of dichlorodifluoromethane (e.g. "Freon 12") was forced in through a valve by nitrogen under a pressure of 200 p.s.i. The polymer was brought into solution by rotating the vessel slowly end over end for 1 hour at 130°. The vessel was then cooled to 120° and the solution was mixed ½ hour and allowed to rest ¼ hour to remove gas bubbles. When the spinneret was opened, the solution issued rapidly to form a continuous, white, opaque elastic fiber. The density of the yarn was 0.064 and the yarn contained about $10^{10}$ cells/cc. Microscopic examination showed the average bubble size to be 10 x 6 microns, with walls approximately 0.1 micron thick. Yarns prepared in this manner have shown a tenacity of 0.18 g.p.d. and an elongation of 150%.

*Example VII*

A cylindrical pressure vessel of 1800 cc. capacity was loaded with 100 grams polypropylene (Hercules' "Profax" 6512E), 126 cc. methylene chloride and pressurized with carbon dioxide to 500 p.s.i. at room temperature. The vessel was heated while rotating end-over-end to 170° and then cooled to 139° C. A circular orifice of 0.008" diameter, 0.025" long, with flat entrance and exit, was then uncovered to allow the polymer solution to flow out under the 1240 p.s.i pressure then existing in the vessel. The polymer solution foamed up and cooled to room temperature very quickly after it emerged from the orifice, forming a continuous, smooth-surfaced, microcellular filament of 30 mils diameter. This filament had a tenacity of 0.80 grams/denier, a denier of 110, and elongation at break of 70% and about $10^7$ cells/cc. The average diameter of the cells was 50 microns and the wall thickness was 0.4 microns. The cells were defined by polyhedral walls, and the polymer comprising the walls exhibited planar orientation with an orientation angle of 10°. The high perfection of uniplanar orientation is evidenced by the complete absence of the (130) reflection and very faint (040) reflection in the electron diffraction pattern. The (110) and (003) reflections are intense and appear as sharp arcs on both the meridian and equator.

The filament was plain woven into a fabric of 30 warp ends per inch and 20 picks per inch, making a tight, highly opaque structure. The covering power of this product was equal to two layers of standard men's cotton shirting fabric, totaling 9 oz./sq. yard and it had a heat insulating value equal to a wool worsted fabric of 8 oz./yd.$^2$, although it weighed only 0.8 oz./yd.$^2$. The woven microfoam yarn fabric had a thickness of 0.027", about equal to the 8 oz. wool worsted, with a springy, pneumatic character that made it useful as an underlayer for upholstery.

A colored yarn was made by following the same procedure outlined above except 10 grams of the polymer was replaced by 10 grams of a color concentrate made by milling together equal weights of green pigment and polypropylene. The colored yarn, containing 5% by weight of pigment, had a moderate degree of color saturation and had tensile properties equal to those of the unmodified yarn.

The same procedure as in Example VII was followed with only the size of the orifice varied. With an orifice much smaller than 0.008", the product was too fragile to weave, but with larger sizes, weavable filaments were formed with larger diameters and lower densities, exemplified by this group of experiments:

| Orifice, mils | Filament Diameter, mils | Denier | Density, grams/cc. | Rate of Yarn Formation, yards/minute |
|---|---|---|---|---|
| 8 | 30 | 110 | .027 | 50 |
| 12 | 60 | 400 | .024 | 110 |
| 20 | 120 | 1,000 | .016 | 210 |
| 28 | 180 | 2,170 | .015 | 700 |
| 40 | 285 | 3,470 | .010 | 2,500 |

Polypropylene microfoam yarn was made as in Example VII but using a different gas to initiate the bubbles. The 1800 cc. pressure vessel was charged with 100 grams of polypropylene, 90 grams of methylene chloride and the quantities of difluorochloromethane shown in the following table. The homogeneous solutions were extruded at 137° C. from a 0.020" orifice. The density of the resulting filaments was measured by submerging them 10" below the surface in water and measuring their buoyancy after the air bubbles on the outside of the filaments were all removed:

| Amount of Difluorochloromethane grams | Density, grams/cc. |
|---|---|
| 6 | .046 |
| 10 | .022 |
| 14 | .015 |
| 40 | .012 |

*Example VIII*

A procedure for making polypropylene microfoam yarn is to charge an 1800 cc. pressure vessel with:

500 grams polypropylene $MI=0.8$
465 grams methylene chloride
230 grams $CCl_2F$—$CClF_2$
20 grams nitrogen
2.5 grams powdered silica gel ("Santocel" 54)

After thorough mixing at 170° C., this solution was cooled to 138° C. where its equilibrium pressure was 500 p.s.i. Additional pressure was placed upon the solution by connecting a 600 p.s.i. nitrogen supply to the vessel and a 0.016" orifice was opened. A smooth, continuous filament emerged at 65 yards per minute that was wound up on bobbins and later woven. The yarn had a denier of 560, a density of 0.020 g./cc., a strength of 0.8 grams per initial denier and an elongation of 95% at break. The speed of yarn generation was readily increased to 120 yards per minute by increasing the external nitrogen pressure to 1000 p.s.i. and further increased to 1100 yards per minute by increasing the temperature to 150° C.

The yarn readily burned when ignited by a match but was made nonflammable by dipping it in a slurry of ammonium phosphate and drying. The slurry was prepared by rolling the ingredients in a ball mill:

50 grams vinyl chloride copolymer VYHH-1
50 grams diammonium phosphate, $(NH_4)_2HPO_4$
400 grams methylene chloride Before the dip, the filament had a density of 0.020 grams per cc. and would continue to burn after the tip was ignited, even when held with the burning end up. The dip increased the density to 0.031 and made the yarn nonflammable to the extent that it would go out when the igniting match was withdrawn when held at any angle except vertically downward. A similar dip was prepared containing 10 grams of chrome yellow pigment and this gave the filament a deep coloration in addition to making it nonflammable.

*Example IX*

Polypropylene foam yarn was made according to the procedure outlined in Example VII, however, the amount of methylene chloride used was reduced to 100 cc. and the extrusion temperature increased to 160°. The filament was cut into cylindrical pieces of highly pneumatic foam, about .035" in diameter and averaging 2" in length. Fifty grams of this product was then dusted with 1 gram of zinc stearate powder which served as a lubricant, allowing the foam particles to move freely and silently against one another. The lubricated microfoam particles were then stuffed into a life jacket from which the original kapok had been removed. The life jacket was submerged in water and its lifting force measured. The microfoam particles had a lifting force of 75 grams per gram of polypropylene where the kapok had only 19. Furthermore, after 14 days of submersion, the microfoam particles still supported 65 grams per gram while the kapok had declined to 12.

*Example X*

A 3 liter stainless-steel pressure vessel was charged with 1,000 grams of linear polypropylene of melt index 0.85 (e.g. Hercules Powder Company's "Profax"), 750 ml. of methylene chloride, 400 grams of chlorodifluoromethane (e.g. "Freon" 22; trademark for Du Pont's refrigerant and propellant) and 2 grams of "Santocel 54" (Monsanto's silica aerogel). This mixture was heated to 155° C. overnight to form a homogeneous solution. After this solution was connected to a source of nitrogen pressure at 600 p.s.i. it was extruded through a spinneret having 25 holes each 10 mils in diameter and the microcellular filaments were collected in a barrel. The filaments were subsequently laid in parallel array between two plates 5¼" apart and compacted under a load of 25 p.s.i. for 10 minutes. The self-coherent billet thus produced had a density of 4 lbs./ft.³. Slices can be cut along any axis of this billet and compacted to densities as high as 40 lbs./ft.³ by further pressing. A particular sample cut perpendicular to the fiber direction was further compacted to a density of 7.3 lbs./ft.³ at a final thickness of 0.5 inch. This sample had a coefficient of linear thermal expansion of 0.006% per ° C., which is the same order of magnitude as common materials of construction. It has a zero coefficient of linear water vapor expansion, a thermal conductivity value $k=0.5$ B.t.u. in./ft.² ° F. hours, and a shear strength of at least 15 p.s.i.

A similar self-coherent billet may be obtained by stuffing as-spun filaments randomly into a 2' x 1' box and compacting them under a 3 ton load for twenty minutes. Samples sliced from such a billet may be "molded" into three-dimensional shapes such as cups, dishes, food board trays, and the like by pressing the sheets between heated matched molds.

Billets may be prepared either from continuous or discontinuous foam filaments. They may be self-bonded, or may be impregnated with a glue or stiffening agent. The properties of the pressed slabs may be further modified by laminating to their surface thin wood veneers, metal or paper foils, etc., to form products suitable for internal wall panels, vibration dampening supports and various non-loading-bearing lumber applications. Large molded slabs suitable for roofing and siding may also be prepared which combine light weight with good thermal insulation, toughness, high tear resistance, and adequate moisture vapor permeability. The slab surface accurately reproduces the mold surface so that slabs may readily be made to closely resemble the relief contours of a shingled roof or a lapped siding, for example. Addition of various fillers to the spinning solution affords further opportunity to modify properties of the pressed slabs. For example addition of sand leads to much tougher and harder (higher modulus) products.

Linear polyethylene microcellular yarns are also useful in this process for making slabs and blocks.

*Example XI*

A 1.8 liter pressure vessel was charged with 500 grams linear polypropylene of melt index 0.8, 425 grams methylene chloride, 50 grams of chlorodifluoromethane and 2.5 grams "Santocel 54." Subsequent to stirring the mixture overnight at 175° C., the temperature was lowered to 150° C. This spin mix was then pushed by 700 p.s.i. nitrogen pressure through a 100-mesh screen and through an orifice. The spin mix emerged from the orifice as a microcellular strand characterized as having cells 80 microns in diameter, 0.2 micron thick walls and planar orientation to within 10 degrees of perfection. The presence of uniplanar orientation is indicated by the very weak intensity of the 040 and 130 reflections. The strand has a total denier of 470 and an overall diameter of 32 mils.

The microcellular material may be extruded as a coating on yarn which is centered and emerges at the same time as the microcellular material from the orifice. A wide variety of yarns can be used as the core. These reinforced microcellular yarns can be woven into fabrics of high strength, bulk and covering power, or twisted to produce cords and ropes.

*Example XII*

400 grams of polyethylene terephthalate polymer (relative viscosity=50, vacuum oven dried at 120° C. for 24 hours) and 250 ml. of methylene chloride (dried over calcium hydride) were charged to a 1 liter pressure vessel, 70 grams of dichlorodifluoromethane (e.g., "Freon 12") was added and the vessel was closed, heated to 210° C. while turning end over end, held at 210° for ten minutes, cooled to 191° C., held 15 minutes, positioned vertically, and pressured with 800 p.s.i. nitrogen. The solution was spun at a velocity of approximately 3,000 y.p.m. through a 20 mil. diameter hole 60 mils long and the fiber collected in a barrel. After heating for 15 minutes at 100° C. to expel residual solvent and realize maximum inflation, the microcellular product is a continuous, smooth, turgid fiber, density=0.023 g./cc.,
tenacity=0.57 g.p.d.,
elongation=39%,
modulus=2 g.p.d. and
denier=1,000 (properties determined on boiled off filaments),
relative viscosity of fiber=29.2.

The yarn is stable to a 20 minute boiloff, elongating only 1.6%. The strand contains about $10^8$ cells/cc. The average cell diameter is 20 microns, the wall thickness 0.1 micron, and the polymer in the cell walls exhibits planar orientation to within 10 degrees. The excellent degree of uniplanar orientation is indicated by the complete absence of both the 110 and 100 reflections. The cell walls exist in polyhedral configuration with substantially no polymeric material present other than that comprising the polyhedral cellular structure.

The high tenacity of this unique microcellular fiber permits backwinding onto cores and weaving into fabric on a power loom. The fabric was an end-and-end and pick-and-pick construction with 840/140/3.5Z nylon yarn in a chain 1; box chain 1 construction. Although there are only nine ends per inch and 4.5 picks per inch, the construction is fairly tight due to the approximately 0.1 inch diameter microcellular polyethylene terephthalate yarn. At a basis weight of only 3.7 oz./yd.² this fabric had a tongue tear of four pounds (contributed mostly by the nylon) and a thickness of 142 mils (contributed mostly by the bulky low denier microcellular polyethylene terephthalate). This fabric has an excellent thermal insulation value as evidenced by its low value of thermal conductivity, $k$, and is quite light in weight compared to the commercial insulating fabrics. This fabric survives without visible damage 10 machine wash cycles at 160° F. and 5 commercial dry cleaning cycles.

TABLE

| | $k \dfrac{\text{(B.t.u.} \times \text{inch)}}{\text{(hour} \times \text{° F.} \times \text{ft.}^2)}$ | Basis Wt. (oz./yd.²) |
|---|---|---|
| 2GT microfoam/nylon fabric | 0.31 | 3.7 |
| "Orlon" [1] pile | 0.38 | 9.9 |
| Commercial jacket [2] | 0.47 | 8.0 |
| Wool | 0.34 | 11.6 |
| Curon [1]/knit fabric laminate | 0.38 | 9.0 |

[1] TM.
[2] McGregor Ram Jet Drizzler.

Another fabric was woven in a plain weave from another polyethylene terephthalate microcellular yarn of 130 denier and a 260 denier nylon yarn in an end-and-end and pick-and-pick construction. This fabric, at a basis weight of only 2.2 oz./yd.², serves as an excellent substrate for vinyl coating, with the nylon contributing sufficient strength to yield grab tensile and tongue tear in excess of 55 pounds and 7 pounds, and the mircrocellular polyethylene terephthalate yarn contributing a luxuriant bulk (approximately 30 mils of thickness) and pneumaticity at low overall basis weight.

In several experiments using the spinning conditions of Example XII, it was demonstrated that the denier of the polyethylene terephthalate microcellular fibers can be varied from 10 to greater than 2,000 by changing the extrusion hole diameter from 3 mils to 40 mils and larger.

The utility of the pneumaticity of these polyethylene terephthalate yarns was demonstrated by stuffing a sample in an upholstery cushion cover to a filling density of 0.73 lbs./ft.³. This cushion is compressed to 75% of its initial height under a load of 0.3 p.s.i., comparable performance to commercial cushions of other materials currently available. This cushion survived four weeks of wear testing with only moderate loss of initial height and pneumaticity.

*Example XIII*

A mixture of equal parts of linear polyethylene of melt index 0.75 and linear polypropylene of melt index 1.08 was prepared by melt blending the components in a screw extruder. 1,000 grams of the polymer blend, 750 cc. methylene chloride, 15 grams "Santocel," 170 grams of chlorodifluoromethane were charged into a pressure vessel. The mixture was heated six hours at 150° C. to form a spinning solution whose autogenous pressure of 450 p.s.i. was increased to 650 p.s.i. with nitrogen pressure just prior to extrusion through a three inch annular die with a 5 mil gap. The microcellular pneumatic sheet thus prepared exhibited desirable properties characteristic of each component. For example, the polyethylene component contributed a degree of drawability and fairly good transverse tensile properties to the sheet, while the polypropylene component contributed greater stiffness and higher temperature resistance than found for similar 100% linear polyehylene microcellular sheets. In fact, this product will withstand brief exposure to temperatures as high as 150° C. without melting, whereas the melting point of linear polyethylene is approximately 135° C. There was no indication of phase separation in the spinning solution, but the two polymers appear to have frozen out at different stages in the spinning operation, as might reasonably be expected from the 30° difference in their melting points. Although the microcellular sheet is an integral structure, it gives the visual impression of being composed of a network of fine strands of microcellular material dispersed throughout its volume and aligned parallel to the machine direction (presumably the polypropylene component) imbedded in a continuous microcellular matrix (presumably the polyethylene component).

*Example XIV*

A mixture of 80 grams of poly(ethylene terephthalate), 125 cc. of methylene chloride and 75 cc. of cyclohexane, is heated to 215° C. in a sealed pressure vessel in contact with a source of helium gas under high pressure. The total pressure in the system $(P+P')$ equals 1200 p.s.i. where P is the sum of the partial vapor pressures of the two liquids. The solution is extruded through an orifice 75 mils long and 75 mils in diameter. A very low density, highly opaque yarn of about 2000 denier is obtained.

Fifty grams of the cut strand were added to a Valley Beater of 1½ lbs. capacity (Valley Iron Works, Beloit, Wisconsin) along with 8 liters of water containing 2½ cc. of "Triton" X100. The slurry was then beaten for 40 minutes using a 2286 gram weight and then for 35 minutes using the full 5.5 kilogram weight. Hand sheets weighing four grams each were prepared by adding an aliquot of beaten slurry to about 6 liters of water containing 20 cc. of 10% "Triton" X100 in an 8 x 8 inch sheet mold, stirring with a spatula to disperse the pulp, and forming a sheet on a 100-mesh screen under gravity until the slurry volume was reduced to about 1 liter when vacuum was applied. The wet water leaf thus obtained, after pressing and removing from the screen, had a tenacity of .009 grams/denier. After drying for 30 minutes under restraint on a Noble and Wood hot plate at 95° C., followed by hot pressing, the paper product yielded a tensile strength of 10.1 lbs./in./oz./yd.²

*Example XV*

A 2-inch diameter Hartig extruder is modified by the addition of a 2-section barrel extension. The screw has a 15/1 L./D. feed section followed by a 4.5/1 L./D. metering section and a 9/1 L./D. torpedo mixing section. It is driven by a 25 hp. motor with a dynamatic adjustable speed coupling. The end of the extruder is fitted with an orifice 0.020 inch in diameter with a 0.040 inch land (preceded by a 100 mesh screen). The barrel is heated by means of eight individually controlled heaters.

A 21 weight percent solution of unsymmetrical trichlorotrifluoroethane in methylene chloride is fed from a graduated reservoir through a heating coil at 80° C. to an injection probe protruding into the flowing polymer stream by means of a Hills-McCanna Co., "McCannameter" diaphragm pump, Model MA-888-D. The methylene chloride solution enters the polymer stream at the transition between the metering and the mixing sections.

A microcellular fiber is extruded under the following conditions:

Polyethylene terephthalate (previously vacuum
    dried at 100° C.) _____lb./hr__ 41.7
Unsym. trichlorotrifluoroethane _____lb./hr__ 3.35
Methylene chloride _____lb./hr__ 12.7
Die melt temperature _____° C__ 225
Die pressure _____p.s.i__ 800–900
Relative viscosity:
    Molding pellets _____ 35
    Fiber _____ 28

The fiber produced under these conditions is macroscopically and microscopically indistinguishable from that spun by the batch process. The yarn was smooth surfaced and pneumatic and was composed of closed cells approximately 10–20 microns in diameter. The apparent density of the yarn is 0.04 g./cc.

*Example XVI*

This example illustrates the operability of the process of this invention at temperatures above the critical temperature of the activating liquid. Presumably expansion of the system down to autogenous pressure upon extrusion into a region at atmospheric pressure cools the system below the critical temperature, whereupon normal adiabatic vaporization cooling completes the process.

Linear polyethylene of melt index 0.9 and n-butane, which has a critical temperature of 153° C., were charged into a pressure vessel, heated and mixed for 4 hours at the indicated temperatures, pressurized with a piston as in Example V, and extruded through a 0.030" diameter, 0.030" long orifice to produce a fibrillated yarn-like strand. Run 4, extruded below the critical temperature, yields a comparable product.

TWISTED YARN PROPERTIES

| Run | (° C.) Temp. | Pol. wt. Conc. (Percent) | Press (p.s.i.g.) | Ten. (g.p.d.) | Break Elong. (Percent) | Denier | Comments |
|---|---|---|---|---|---|---|---|
| 1 | 160 | 15 | 4,500 | 4.5 | 46 | 275 | Well fibrillated. |
| 2 | 170 | 15 | 4,500 | 6.1 | 35 | 180 | Very well fibrillated. |
| 3 | 180 | 10 | 4,500 | 6.0 | 35 | 220 | Do. |
| 4 | 135 | 15 | 4,000 | 4.2 | 35 | 430 | Well fibrillated. |

The initial conditions of temperature and concentration for Runs 1, 2 and 3 correspond to points in area A above the critical temperature, as illustrated in FIGURE 4.

*Example XVII*

A 20 weight percent solution of poly(tetramethylbutadiene) in methylene chloride is heated to 185° C. in a pressure vessel at a total pressure of 455 p.s.i.g. The solution is extruded through the spinneret of FIGURE 11, having a 30 mil diameter orifice, into a region at one atmosphere pressure to produce a continuous integral strand.

*Example XVIII*

A 20.2% solution in ethanol of poly(hexamethylene adipamide), of inherent viscosity of 1.6 (in meta-cresol), is produced by heating these materials to 230° C. in a closed container under autogenous pressure with agitation. Upon discharging this solution into the atmosphere through an orifice 75 mils long and 75 mils in diameter preceded by a needle valve (Hoke, Inc., Englewood, N.J., Part Number 327) a continuous, plexifilament is obtained at a velocity of about 5,500 y.p.m., and having a denier of 3200. The surface area, as determined by nitrogen adsorption is 2.5 m.²/g.

*Example XIX*

A 15.7% solution in methylene chloride of "Delrin" polyformaldehyde resin (marketed by Du Pont) of 46,500 molecular weight heated to 200° C. at autogenous pressure is discharged into the atmosphere through a 75 mils diameter, 75 mils long orifice preceded by the Hoke valve Number 327. A continuous plexifilament is obtained which, after drawing 4.5X over a 148° C. hot plate, gives a fiber with a tenacity of 1.8 g.p.d., an elongation of 8.5%, an initial modulus of 29 g.p.d., an average thickness of filmy material of 1.8 microns, and a surface area of 5.6 m.$^2$/g. When tested as a cigarette filter material, this plexifilament was found to adsorb more non-volatile material than an equal weight of a commercial cellulose acetate filter material.

*Example XX*

Linear polyethylene of melt index 0.50 is mixed in methylene chloride-butane (95–5 volume percent) to produce a 13.5% polymer mixture. The mixture is heated with agitation in a pressure vessel to 200° C. which produces a homogeneous solution with an autogenous pressure of about 545 p.s.i. The pressure vessel is connected via a valved transfer line to a spinneret which has a single orifice with a diameter of 75 mils and a length of 75 mils. Upon suddenly opening the above-mentioned valve, the solution is ejected and forms a continuous plexifilament strand which is well fibrillated. The strand as spun has a denier of 393, a tenacity of 0.8 g.p.d., an elongation of 47% and a modulus of 4 g.p.d.

*Example XXI*

A 13% solution of linear polyethylene in methylene chloride at 200° C. is saturated with $CO_2$ at a total equilibrium pressure in the vessel of 1,000 p.s.i. The amount of $CO_2$ dissolved in the solution is 3.7%. Before spinning a pressure of 1060 p.s.i. of nitrogen is impressed on the solution, but the solution is not equilibrated with this gas, i.e., the nitrogen does not dissolve to saturation in the solution. The solution is then extruded through a simple "knife-edge" orifice whose diameter is 67 mils. A well fibrillated plexifilament strand is obtained at about 12,000 y.p.m. The strand has a denier of 1120, a tenacity of 3.9 g.p.d., an elongation of 78%, a surface area of 8.5 m.$^2$/g. and an X-ray diffraction orientation angle of about 24°. The pellicular material averages less than 2 microns in thickness and has an electron diffraction orientation angle of 30°.

*Example XXII*

A 13% solution of linear polyethylene in methylene chloride at 200° C. is saturated with nitrogen gas at 1915 p.s.i. total pressure. Before spinning, a pressure of 1950 p.s.i. is impressed on the solution but equilibrium is not established at that pressure. About 2% of nitrogen exists dissolved in the solution. The solution is then extruded through a two-orifice spinneret as shown in FIGURE 9, the first orifice having a diameter of 70 mils with a length of 70 mils and the second orifice being a knife-edge type 67 mils in diameter. The pressure between the two orifices is 1490 p.s.i. A plexifilament strand or yarn is produced at a rate of about 8500 y.p.m.

The yarn produced has unusually high bulk and is formed of relatively short and numerous film-fibrils. The yarn is equal in many aesthetic qualities to high quality spun staple yarns or texturized continuous filament yarns. The tenacity is about 1 gm./denier and the surface area is about 9.0 m.$^2$/gm.

*Example XXIII*

A 15% solution of a linear polyethylene (0.9 melt index) in pentane is prepared at a temperature of 170° C. and total pressure (impressed by a suitable piston assembly) of 3000 p.s.i. Spinning is carried out by means of a spinneret whose orifice has a diameter of 50 mils and a length of 50 mils. A well fibrillated plexifilament strand is obtained.

*Example XXIV*

A 14% solution of a linear polyethylene (0.6 melt index) in fluorotrichloromethane is prepared at a temperature of 187° C. and a total pressure of about 1600 p.s.i. By passage of the solution through a pressure letdown valve immediately prior to the spinneret, a temperature of 185° C. and a pressure of 860 p.s.i. are reached within the spinneret. These conditions insure that the solution is converted into a two-liquid-phase dispersion prior to final extrusion. The spinneret is similar to that shown in FIGURE 10. The spinneret orifice has a diameter of 32 mils and a length of 62 mils while the shroud has a diameter of 135 mils and a length of 152 mils. However, in this case the shroud has an outer diameter of about 2 inches so that the terminal end of the shroud has the appearance of a circular plane with a central hole when viewed in a direction opposite to the spin direction. A well fibrillated plexifilamentary strand was produced.

*Example XXV*

An 18% solution of a linear polyethylene (0.5 melt index) in fluorotrichloromethane is prepared essentially by the method of Example XXIV to provide a two-phase system at the spinneret. In this example the spinneret orifice has a diameter of 32 mils and a length of 50 mils. The primary as-spun product is a well fibrillated, plexifilament strand.

*Example XXVI*

A 16% solution of a linear polyethylene (1.4 melt index) in methylene chloride is prepared at 205° C. and a total pressure of 700 p.s.i. A 50 mil diameter, 50 mil long spinneret similar to that of FIGURE 10 is used, having a terminal shroud diameter of 0.375 inch and length of 0.500 inch. A plexifilament strand of highly-fluted essentially continuous outward tubular form which is not completely filled is obtained. The inner lining of the tubular strand comprises an interconnecting, 3-dimensional assembly of film-fibrils arranged in a unique cross-hatched array in interconnecting layers. A probe can be inserted into a cut end of the partly hollow tubular strand along its principal axis without occasioning cohesive tearing of the film-fibril plexus which forms an integral lining within the outer wall of the tubular strand. The as-spun plexifilament strand has a tenacity of 2.6 g.p.d. and an elongation of 56%. A wet-process paper made from the product yarn has a tensile strength of 15.4 lbs./in./oz./yd.$^2$, an elongation of 56% and an Elmendorf tear value of 1 lb./oz./yd.$^2$

*Example XXVII*

A 10% solution of a linear polyethylene (0.58 melt index) in methylene chloride is prepared and spun according to the method of Example XXVI except that the spin temperature is 197° C. A plexifilament strand is obtained in a tubular form which is coextensively split open in a direction more or less parallel to the principal axis of the strand. The highly folded ribbon-like vestigial "outer wall" comprises a plexifilamentary assembly of essentially parallel film-fibrils which appear to be embedded in a thin filmy matrix. The as-spun strand has a tenacity of 4.3 g.p.d. and an elongation of 61%. The essentially fibrillar character of this "split-tubular" plexifilamentary yarn form is readily demonstrated by subjection of the strand to an air-jet texturizing treatment which will impart a highly-fibrillated, open, high-bulk form to the yarn.

*Example XXVIII*

A pressure vessel is charged with 90 g. of polyethylene terephthalate (relative viscosity of 49), 90 ml. of methylene chloride, and 20 ml. of dichlorotetrafluoroethane, heated to a temperature of 205° C. and extruded under a total pressure of 840 p.s.i.g. of nitrogen. The 0.012" diameter orifice is preceded by a 200 mesh screen located 1" away. As might be predicted from consideration of FIGURE 6, the initial product is a microcellular closed cell filament. However, after a few seconds' operation, the product produced is a plexifilamentary strand, due to the operation of a preflashing mechanism at the up-stream screen.

Example XXIX

This example illustrates a coupled process for the production of polymer in the activating liquid followed by extrusion of the solution after the temperature and pressure have been adjusted to the desired values.

Ethylene was inserted into a pentane feed stream and fed to a reactor at the rate indicated below. The catalyst made up of $VOCl_3$ and $TiCl_4$ with a cocatalyst of aluminum triisoprenyl was dissolved in pentane to form standard solutions and fed to the reactor. The molecular weight or melt index of the polymer is controlled by adding hydrogen to the reaction mixture. A two liter stirrer equipped rector was employed and the solution formed was collected in an accumulator which consisted of a cylinder about five inches in diameter and four feet long.

Flow rates into the reactor were as follows:

| | |
|---|---|
| Pentane | mls./min__ 235 |
| Ethylene | gms./min__ 30 |
| Aluminum triisoprenyl solution | mls./min__ 10.5 |
| $TiCl_4+VOCl_3$ solution | mls./min__ 9.6 |
| Hydrogen solution | mls./min__ 4.0 |

The concentration of the feed solution was:

| | |
|---|---|
| Aluminum triisoprenyl | moles/liter__ 0.00773 |
| $TiCl_4$ | do____ 0.012 |
| $VOCl_3$ | do____ 0.00359 |
| Hydrogen | gms./liter__ $5.65\times10^{-4}$ |

The temperature in the reactor was 138–142° C. and was controlled by regulating the temperature of the pentane feed stream. Some heat of reaction was removed by the walls of the reactor which were cooled by a stream of air. The feed stream had a temperature of about —10° C. The pressure during polymerization was maintained at 2000 p.s.i.

When the accumulator was full it was isolated from the polymerization vessel and the pressure raised to 3500 p.s.i. It was then heated to 165° C. by means of a steam jacket which surrounded it. It was held at this temperature for about one hour to assure uniform temperature and then the solution was discharged through a spinneret orifice .040 inch in diameter and .040 inch in length to form a yarn which was collected in a wire basket. In the basket it formed an orderly package which could then be backwound. The pressure exerted on the system during spinning was 4000 p.s.i. The time taken for the spin was 135 secs. and 2 lbs. 15 oz. of yarn were collected. A melt index of the polymer forming the yarn showed that at the beginning of the spin it was 0.87 and at the end it was 0.18. The denier was 530 and the yarn was highly fibrillated and strong.

The solution concentration was calculated from the weight of yarn formed and was found to be 13.3% polymer.

Example XXX

A highly fibrillated strand of a copolymer of perfluoroethylene/perfluoropropylene (90/10) is produced by heating 90 g. of the polymer and 300 cc. p-bis(trifluoromethyl)benzene to 243° C. to form a solution whose autogeneous pressure is 225 p.s.i.g. The pressure is raised to 300 p.s.ig. by adding $N_2$ gas prior to extrusion through a 0.035″ x 0.050″ orifice followed by a 90° flare.

What is claimed is:

1. An extrusion process comprising preparing a solution of a synthetic crystalline organic polymer in an activating liquid, said activating liquid having a boiling point at least 25° C. below the melting point of the polymer and being a solvent for the polymer at the extrusion conditions while dissolving less than 1% of the polymer at temperatures up to the normal solvent boiling point, said solution having a temperature prior to extrusion greater than the freezing point of the solution and below that temperature where adiabatic evaporation of all the activating liquid present will produce insufficient cooling for solid polymer precipitation, and the concentration of activating liquid prior to extrusion being between 98% by weight and a minimum amount sufficient to precipitate solid polymer on adiabatic evaporation, extruding the solution through an orifice into a region of substantially lower pressure and temperature whereby vaporization of the activating liquid rapidly cools the solution to the temperature at which solid polymer precipitates and freezes in the polymer orientation.

2. The process of claim 1 wherein the activating liquid has a boiling point at least 60° C. below the melting point of the polymer.

3. The process of claim 1 wherein the synthetic crystalline organic polymer is a polyhydrocarbon.

4. Process according to claim 1 wherein the synthetic crystalline organic polymer is linear polyethylene and the activating liquid is methylene chloride.

5. Process according to claim 1 wherein the synthetic crystalline organic polymer is linear polyethylene and the activating liquid is fluorotrichloromethane.

6. Process according to claim 1 wherein the synthetic crystalline organic polymer is linear polyethylene and the activating liquid is pentane.

7. Process according to claim 1 wherein the synthetic crystalline organic polymer is linear polyethylene and the activating liquid is butane.

8. Process according to claim 1 wherein the synthetic crystalline organic polymer is polyethylene terephthalate and the activating liquid is methylene chloride.

9. Process according to claim 1 wherein the said solution contains dissolved therein an amount of gas which will yield a pressure drop across the orifice sufficient to produce a rate of bubble nucleation exceeding $10^{10}$ nuclei/cc./second.

10. Process according to claim 1 wherein the said solution contains dispersed therein a solid nucleating agent in sufficient amount to produce at least $10^6$ bubble nuclei per cc. of solution upon extrusion through the orifice.

11. Process according to claim 9 wherein the synthetic crystalline organic polymer is a hydrocarbon polymer.

12. Process according to claim 10 wherein the synthetic crystalline organic polymer is a hydrocarbon polymer.

13. Process according to claim 1 wherein the said synthetic crystalline organic polymer has been synthesized in said activating liquid.

14. The process of claim 13 wherein the synthetic crystalline organic polymer is a hydrocarbon polymer and the activating liquid is a hydrocarbon.

15. Process according to claim 8 wherein the said solution contains dissolved therein an amount of gas which will yield a pressure drop across the orifice sufficient to produce a rate of bubble nucleation exceeding $10^{10}$ nuclei/cc./second.

16. Process according to claim 8 wherein the said solution contains dispersed therein a solid nucleating agent in sufficient amount to produce $10^6$ bubble nuclei per cc. of solution upon extrusion through the orifice.

17. The process of claim 1 wherein the activating liquid is methylene chloride.

18. The process of claim 3 wherein the activating liquid is fluorotrichloromethane.

19. The process of claim 3 wherein the polymer is linear polypropylene.

20. The process of claim 19 wherein the activating liquid is methylene chloride.

References Cited by the Examiner

UNITED STATES PATENTS

| | | | |
|---|---|---|---|
| 2,268,160 | 12/1941 | Miles | 260—2 |
| 2,850,467 | 9/1958 | Livingood | 264—316 XR |
| 2,861,898 | 11/1958 | Platzer | 260—2 |
| 2,864,778 | 12/1958 | Mladinich | 260—2 |

(Other references on following page)

UNITED STATES PATENTS

| | | | |
|---|---|---|---|
| 2,867,495 | 1/1959 | Meyers | 264—205 |
| 2,888,415 | 5/1959 | Jankens | 260—2 |
| 2,911,382 | 11/1959 | Barkhuff et al. | 260—2 |
| 2,941,965 | 6/1960 | Ingram | 260—2 |
| 3,067,147 | 12/1962 | Rubens et al. | 260—2 |
| 3,121,911 | 2/1964 | Lightner | 260—2 XR |
| 3,150,214 | 9/1964 | Sealora et al. | 260—2 XR |

FOREIGN PATENTS 854,586   11/1960   Great Britain.

OTHER REFERENCES

SPE Journal, "Controlled Density Polystyrene Foam Extrusion," by F. H. Collins, July 1960 (pp. 705–109).

ALEXANDER H. BRODMERKEL, *Primary Examiner.*